(12) United States Patent
Sharpe et al.

(10) Patent No.: US 6,341,282 B1
(45) Date of Patent: Jan. 22, 2002

(54) INFORMATION RETRIEVAL SYSTEM AND METHOD

(75) Inventors: Scott A. Sharpe, Port Huron; Steven J. Lundberg, Royal Oak; William E. Bejcek, Clarkston, all of MI (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/295,234

(22) Filed: Apr. 19, 1999

(51) Int. Cl.[7] .............................................. G06F 17/30
(52) U.S. Cl. .............................................. 707/3; 707/4
(58) Field of Search ...................... 707/1–10, 100–103, 707/203, 205, 500, 526, 511

(56) References Cited

U.S. PATENT DOCUMENTS 5,870,740 A * 2/1999 Rose et al. ..................... 707/5
5,873,077 A * 2/1999 Kanoh et al. .................. 707/3
6,029,167 A * 2/2000 Evans ............................ 707/4

* cited by examiner

Primary Examiner—Hosain T. Alam
Assistant Examiner—Alford W. Kindred
(74) Attorney, Agent, or Firm—Baker Botts LLP

(57) ABSTRACT

A system for retrieving and scoring of information from an information source includes a user interface operable to receive one or more search criterion and an importance rate assigned to each of the search criterion. A processor is coupled to the user interface and the information source and is operable to retrieve information from the information source. The system also includes a computer-readable storage medium coupled to the processor. A computer program encoded on the computer-readable storage medium and executable by the processor scores the retrieved information using the search criterion and the importance rates assigned to the search criterion.

28 Claims, 6 Drawing Sheets

INFORMATION RETRIEVAL SYSTEM AND METHOD

TECHNICAL FIELD OF THE INVENTION

This invention relates in general to the field of information management, and more particularly, to a information retrieval system and method.

BACKGROUND OF THE INVENTION

Many people use information as part of their function within a business or other organization. It is often desirable to search for and retrieve information from one or more information sources. For example, one type of information source may include an inventory database containing information relating to products available for sale to a consumer. A person, such as a salesman or a consumer, may search the inventory database for products having attributes or criteria that the consumer is requesting.

A known technique for searching and retrieving information allows a person to construct a query using a series of terms or search criteria. However, this technique may not be suitable for locating information that may not exactly match the query search criteria. For example, a consumer may consider a particular product as an acceptable substitute for a product that exactly matches the search criteria of an inventory database query. However, additional queries may be necessary before information relating to the substitute product is available. Additionally, information relating to the substitute product may not become available unless one of the query search criteria specified by the consumer exactly matches information contained in the inventory database.

SUMMARY OF THE INVENTION

In accordance with the present invention, the disadvantages and problems associated with prior information retrieval systems and methods have been substantially reduced or eliminated.

In accordance with one embodiment of the present invention, a method for retrieving and scoring information from an information source includes receiving one or more search criterion and assigning an importance rate to each of the search criterion. The method also includes generating a search request using the search criterion, issuing the search request to the information source, and retrieving information from the information source in response to the search request. The method further includes determining an achieved importance value for each of the search criterion using the information retrieved from the information source and the importance rate assigned to each of the search criterion.

The present invention has several important technical advantages. For example, a search query may be constructed using weighted search criteria according to the relative importance of each of the search criterion. The information retrieved from the information source may be scored enabling a user to determine how closely the information matched the search query. Additionally, because the invention scores information that does not exactly match the search criteria, additional information that may be acceptable or helpful to the user of the invention is provided without performing additional search queries.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

Figure 1:
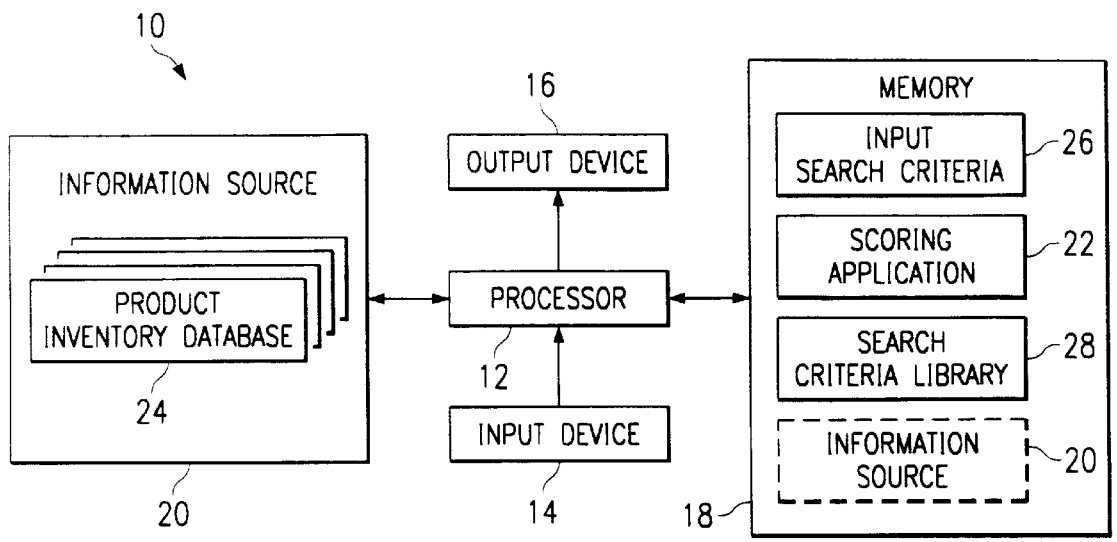
FIG. 1 is an example information retrieval system in accordance with an embodiment of the present invention.

The present invention provides an information retrieval system and method for retrieving, evaluating, and scoring information. In an embodiment shown in FIG. 1, for example, an information retrieval system 10 comprises a processor 12, an input device 14, an output device 16, a memory 18 and an information source 20. The present invention also encompasses computer software that may be stored in memory 18 and executed by processor 12. The computer software may also be stored in a variety of other types of storage media including, but not limited to, floppy disk drives, hard drives, CD ROM disk drives, or magnetic tape drives. Query data or search criteria may be received from a user of information retrieval system 10 using a keyboard or any other type of input device 14. Search results may be output to a user of information retrieval system 10 through output device 16, which may include a display, printer, or any other type of output device.

Information retrieval system 10 includes a scoring application 22, which is a computer software program. In FIG. 1, scoring application 22 is illustrated as being stored in memory 18, where it can be executed by processor. 12. Scoring application 22 may also be stored on a variety of other types of storage media. Scoring application 22 processes information from various information sources 20 and evaluates the information in those information sources 20 based on selected search criterion. By way of example, information source 20 may comprise one or more product inventory databases 24. Information source 20 may be stored on a variety of other types of storage media including, but not limited to, memory 18 or on a server in a client-server environment.

Information retrieval system 10 illustrated in FIG. 1 also includes input search criteria 26 stored in memory 18. Input search criteria 26 includes attributes and values to be used in searching information source 20. For example, input search criteria 26 may include colors, models, shapes, textures, or other attributes to be used in searching for information from information source 20. Processor 12 may receive input search criteria 26 from a user via input device 14 and stores the input search criteria 26 in memory 18.

Information retrieval system 10 may also include a search criteria library 28 stored in memory 18. Search criteria library 28 may contain predetermined search criteria for information stored in information source 20. Processor 12 may retrieve the predetermined search criteria from search criteria library 28 and display the predetermined search criteria to a user. The user may then use input device 14 to select various predetermined search criteria for initiating a search request of information source 20. Processor 12 then stores the selected predetermined search criteria in memory 18 as input search criteria 26.

Search criteria library 28 may also be used to validate input search criteria 26 received from a user. For example, a user may input various search criterion using input device 14. Search criteria library 28 may be used to validate the search criterion entered by the user to ensure that the entered search criterion conforms to information stored in information source 20. If the search criterion entered by the user does not conform to the information contained in information source 20, the user may be prompted to delete, edit, or select other search criterion to conform to the information stored in information source 20. Additionally, a list of the search criteria stored in search criteria library 28 may be provided to the user so that the user may select search criterion conforming to the information stored in information source 20.

In the embodiment shown in FIG. 1, processor 12 accesses information or data from information source 20. Scoring application 22 evaluates the information retrieved from information source 20 using input search criteria 26 stored in memory 18 to determine how closely the information contained in information source 20 matches input search criteria 26. Scoring application 22 scores the information retrieved from information source 20 using input search criteria 26. The results of the search request are provided to the user via output device 16.

Figure 2:
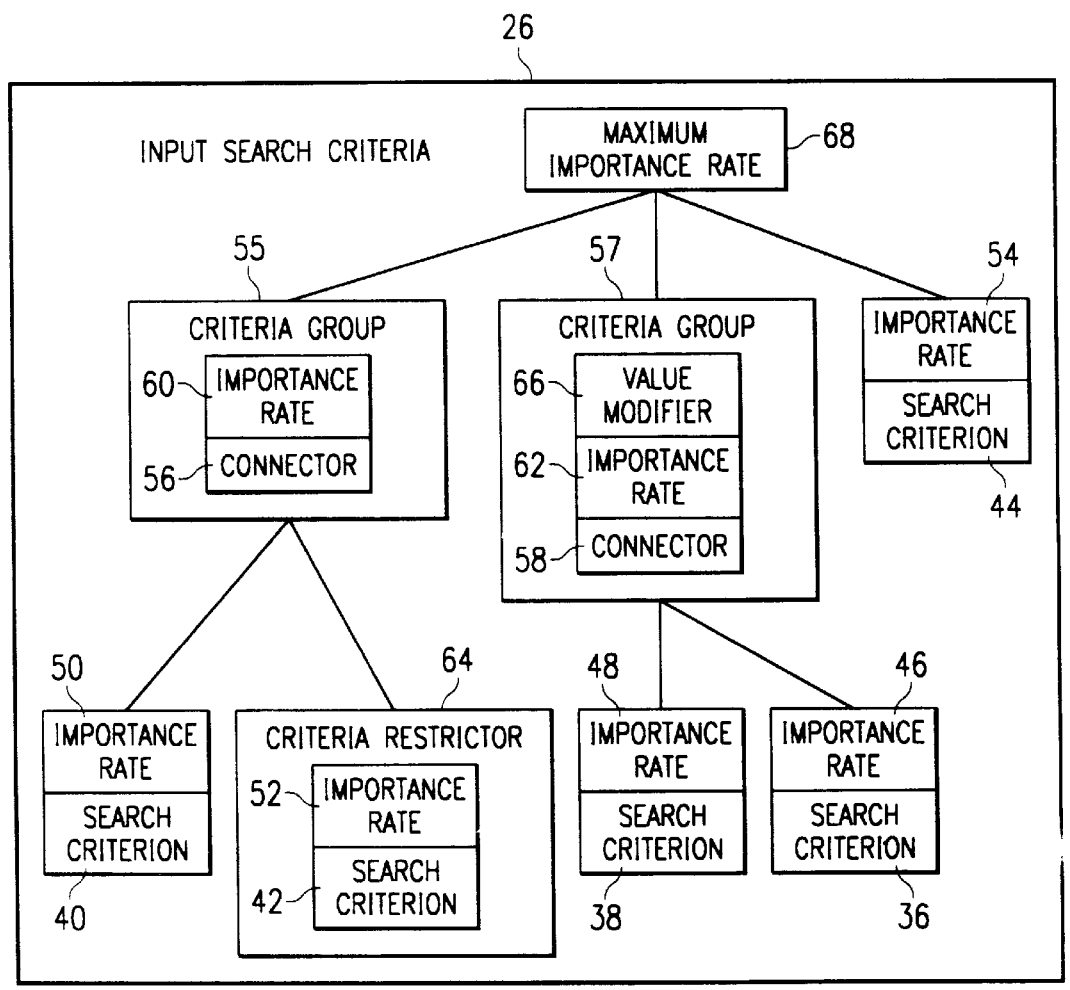
FIG. 2 is an example search query in accordance with an embodiment of the present invention.

FIG. 2 is a block diagram of an example search query stored as input search criteria 26 in accordance with an embodiment of the present invention. Input search criteria 26 includes one or more search criterion 36, 38, 40, 42 and 44. Search criterion 36, 38, 40, 42 and 44 may include attributes to be used in searching for information in information source 20. For example, inventory databases 24 of information source 20 may include product information. Thus, attributes of the product information stored in inventory databases 24 may include color, size, shape, texture, and any other suitable characteristics used in describing or searching for product information stored in information source 20.

Input search criteria 26 also includes importance rates 46, 48, 50, 52, and 54 assigned to each search criterion 36, 38, 40, 42, and 44. The importance rates 46, 48, 50, 52, and 54 assigned to each search criterion 36, 38, 40, 42, and 44 designate the importance or weight of the particular search criterion relative to other search criterion of the search request. For example, a user may consider search criterion 36 more important than search criterion 38. Thus, the user may assign a value of 10 for importance rate 48 associated with search criterion 38 and a value of 20 for importance rate 46 associated with search criterion 36. Therefore, search criterion 36 is assigned a greater weight, or importance, than search criterion 38. Values for importance rates 46, 48, 50, 52 and 54 may be assigned by the user, selected by the user from a displayed list of values, or assigned predetermined default values.

Importance rates 46, 48, 50, 52, and 54 may also be used to score the information retrieved from information source 20. Scoring application 22 determines an achieved criterion score for each of the search criterion of the search request based on how closely the retrieved information matches the search criterion. For example, if the retrieved information matches the search criterion, the achieved criterion score for the search criterion may be equal to the value assigned to the importance rate associated with the search criterion, a percentage of the value assigned to the importance rate associated with the search criterion, or a predetermined default value. If the retrieved information does not match the search criterion, the achieved criterion score for the search criterion may be equal to zero, a percentage of the value assigned to the importance rate associated with the search criterion, or a predetermined default value.

For example, search criterion 40 may be assigned a color criterion of blue, and importance rate 50 associated with search criterion 40 may be assigned a value of 10. If information retrieved from information source 20 matches a color criterion of blue, the achieved criterion score associated with search criterion 40 may be equal to the value assigned as importance rate 50, which would be equal to a value of 10. If the information retrieved from information source 20 does not match a color criterion of blue, the achieved criterion score may be equal to zero or a predetermined default value. For example, if information retrieved from information source 20 includes a color of cyan and a color of red, the achieved criterion score for the color of cyan may be equal to 3 and the achieved criterion score for the color of red may be equal to zero. Thus, achieved criterion scores are determined based on how closely the retrieved information matches search criterion of the search request.

Input search criteria 26 may also include criteria groups 55 and 57. Criteria groups include two or more search criterion grouped or associated together. For example, as illustrated in FIG. 2, criteria group 55 includes search criterion 40 and search criterion 42, and criteria group 57 includes search criterion 36 and search criterion 38. Input search criteria 26 may also include connectors to define the relationship between associated search criteria. As illustrated in FIG. 2, connector 56 is used to define the relationship between search criteria 40 and 42, and connector 58 is used to define the relationship between search criteria 36 and 38. For example, information may be evaluated and scored based on whether the information matches either search criterion 38 or search criterion 36. Further, for example, information may be evaluated and scored based on whether the information matches both search criterion 38 and search criterion 36.

Input search criteria 26 may also include group importance rates 60 and 62 for criteria groups 55 and 57, respectively. Group importance rates 60 and 62 may be used to designate the weight, or importance, of the criteria groups relative to other search criterion or other criteria groups. For example, group importance rate 60 may be assigned a value of 10 and group importance rate 62 may be assigned a value of 20. Therefore, criteria group 57 of associated search criteria 36 and 38 are assigned a greater weight, or importance, than criteria group 55 of associated search criteria 40 and 42.

As discussed above in connection with importance rates 46, 48, 50, 52 and 54, group importance rates 60 and 62 may also be used to score information retrieved from information source 20. Scoring application 22 determines an achieved group score for the criteria group based on how closely the retrieved information matches each of the search criteria of the criteria group. For example, if the retrieved information matches all of the search criteria of the criteria group, the achieved group score for the criteria group may be equal to the value assigned to the group importance rate or a predetermined default value. If the retrieved information does not match all of the search criteria of the criteria group, but does match at least one of the search criteria of the criteria group, the achieved group score may be equal to a percentage of the value assigned to the group importance rate or a predetermined default value. If the retrieved information does not match any of the search criteria of the criteria group, the achieved group score may be equal to zero, a percentage of the group importance rate, or a predetermined default value. Thus, scoring application 22 determines an achieved group score for the criteria group based on how closely the retrieved information matches each of the search criteria of the criteria group. An example of scoring information using associated search criteria is described below in connection with FIGS. 6 and 7.

Input search criteria 26 may also include a criteria restrictor 64 and a value modifier 66. Criteria restrictor 64 may be used for further defining search criterion or associated search criteria. For example, criteria restrictor 64 may be defined so that information is evaluated and scored based on whether the information does not match the search criterion. For example, search criterion 42 may include a color criterion of blue. Criteria restrictor 64 may be defined so that information is evaluated and scored based on whether the information does not match a color criterion of blue. An example of scoring information using a criteria restrictor is described below in connection with FIG. 8.

Value modifiers may be used to vary the weight, or importance, of search criterion or criteria groups relative to other search criterion or criteria groups. As previously described, scoring application 22 determines achieved criterion scores for search criterion and achieved group scores for associated search criteria based on how closely the retrieved information matches input search criteria 26. Value modifiers may be used to reduce the achieved scores to zero, a percentage of the determined achieved score, or a predetermined default value.

For example, as illustrated in FIG. 2, value modifier 66 may be associated with criteria group 57 for associated search criteria 36 and 38. If the information retrieved from information source 20 matches search criterion 38 but does not match search criterion 36, the achieved group score for criteria group 57 may be a percentage of the value assigned to group importance rate 62. However, the achieved group score determined for criteria group 57 may be reduced to zero using value modifier 66 because the information retrieved from information source 20 did not match both search criterion 36 and search criterion 38. Thus, value modifier 66 may be used to alter the achieved group score for criteria group 57, thereby altering the importance of criteria group 57 relative to other search criterion or criteria groups of the search request. An example of scoring of information using value modifiers is described below in connection with FIG. 9.

Input search criteria 26 may also include a maximum importance rate 68. Maximum importance rate 68 is determined by combining the first level Importance rates of input search criteria 26 for the search request. For example, maximum importance rate 68 for input search criteria 26 illustrated in FIG. 2 would be equal to the sum of importance rate 60, importance rate 62, and importance rate 54.

Generally, information retrieval system 10 retrieves information from information source 20, evaluates the retrieved information using input search criteria 26, and scores the retrieved information using scoring application 22 and input search criteria 26. Achieved scores are determined based on how closely the retrieved information matches input search criteria 26. Importance rates assigned to search criterion and criteria groups of input search criteria 26 may be used to determine the achieved scores. Additionally, the determined achieved scores may be used to determine an achieved search score for the search request. The scored retrieved information may be provided to a user of information retrieval system 10 for further evaluation. Example search requests are described below in connection with FIGS. 5–9.

Figure 3:
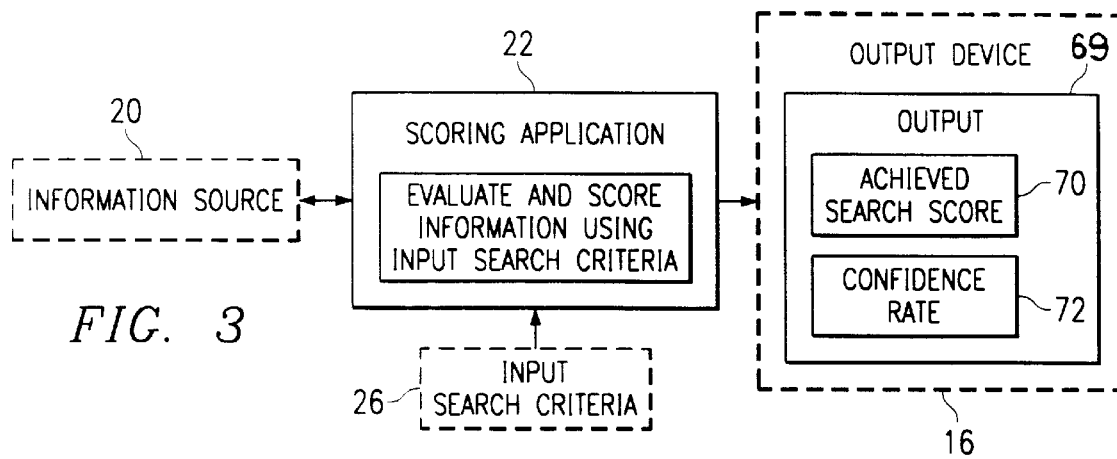
FIG. 3 is an example information retrieval system in accordance with an embodiment of the present invention.

FIG. 3 is an example information retrieval system 10 in accordance with an embodiment of the present invention. A user of information retrieval system 10 may have the option of selecting one or more information sources 20 for performing a search request. Additionally, the user may have the option of selecting one or more databases of each information source 20 for performing a search request. For example, the user may select one or more inventory databases 24.

After retrieving information from information source 20, scoring application 22 scores the retrieved information using input search criteria 26. After scoring the retrieved information, scoring application 22 outputs the scored retrieved information. Output of scored retrieved information is identified in FIG. 3 as output 69. Output 69 may be in the form of a display, printed output, or any other output media. Output 69 illustrated in FIG. 3 includes an achieved search score 70 for the search request and a confidence rate 72. However, output 69 may also include other scoring values for the retrieved information.

Achieved search score 70 for the search request is determined by combining the first level of determined achieved scores of the search request. For example, referring to FIG. 2, scoring application 22 determines an achieved criterion score for each search criterion of input search criteria 26. Scoring application 22 also determines an achieved group score for each criteria group of input search criteria 26. Scoring application 22 then determines achieved search score 70 by combining the first level of achieved scores determined for the search request. Thus, achieved search score 70 for the search request illustrated in FIG. 2 would be equal to the sum of the achieved group score determined for criteria group 55, the achieved group score determined for criteria group 57, and the achieved criterion score determined for search criterion 44. An example of determining achieved search score 70 is described below in connection with FIGS. 5–9.

Confidence rate 72 is generally defined as a value assigned to the retrieved information based on how closely the retrieved information matches input search criteria 26. For example, confidence rate 72 may be expressed as a percentage of the maximum importance rate of the search request. Referring to FIGS. 2 and 3, for example, confidence rate 72 may be expressed as a percentage of maximum importance rate 68 using achieved search score 70. Thus, output 69 of information retrieval system 10 may include the retrieved information displayed in descending order based on confidence rates 72 determined for the retrieved information.

Figure 4:
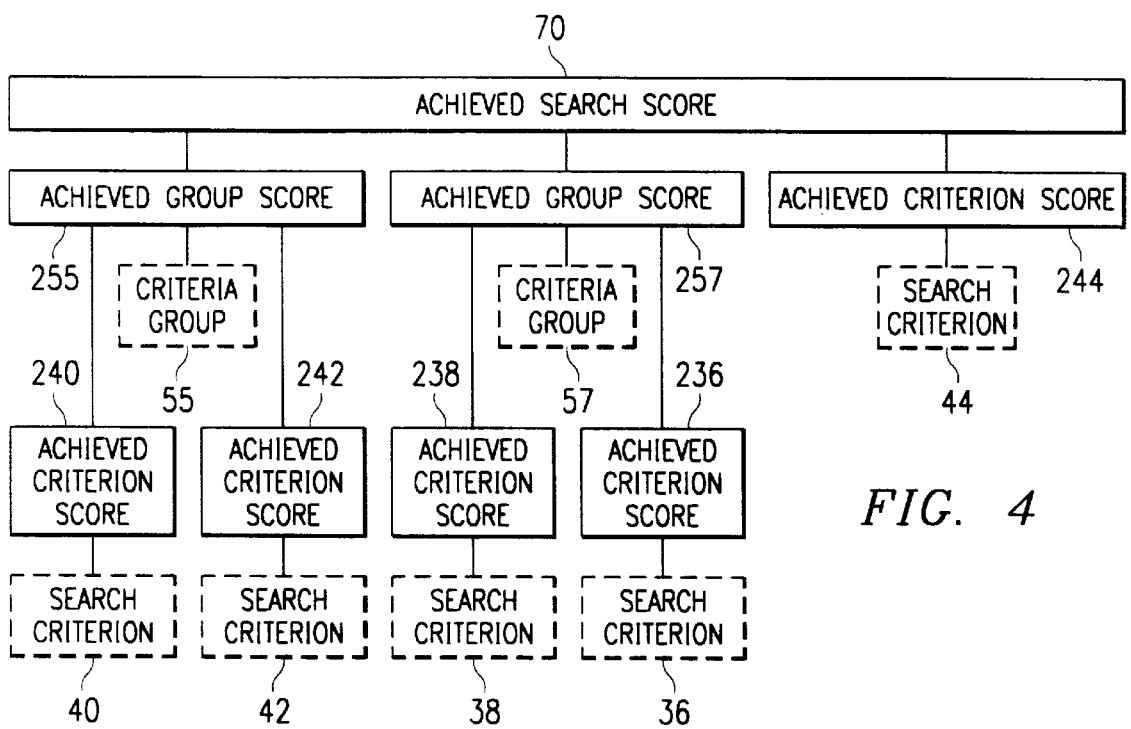
FIG. 4 is an example of achieved scores determined for the example search query of FIG. 2 in accordance with an embodiment of the present invention.

FIG. 4 is an example of achieved scores determined for the example search query illustrated in FIG. 2 according to an embodiment of the present invention. In this example, scoring application 22 determines achieved criterion scores 236, 23.8, 240, 242;. and 244 for each search criterion 36, 38, 40, 42, and 44, respectively. As previously discussed, the importance rate assigned to each search criterion may be used for determining an achieved criterion score for each search criterion. However, other suitable methods or values may be used for determining achieved criterion scores for each of the search criterion.

Scoring application 22 also determines achieved group scores 255 and 257 for criteria groups 55 and 57, respectively. As previously discussed, scoring application 22 determines achieved group scores 255 and 257 based on how closely the retrieved information matches search criteria included in the criteria group. For example, scoring application determines achieved group score 255 based on how closely the retrieved information matches search criterion 40 and search criterion 42 of criteria group 55. As previously discussed, importance rates assigned to search criteria 40 and 42 and the importance rate assigned to criteria group 55 may be used for determining achieved group score 255. However, other suitable methods or values may also be used for determining achieved group score 255.

Scoring application 22 also determines achieved search score 70 by combining the first level of achieved scores of the search request. For example, as illustrated in FIG. 4, achieved search score 70 would be equal to the sum of achieved group score 255, achieved group score 257, and achieved criterion score 244.

Therefore, scoring application 22 determines achieved scores for input search criteria 26 based on how closely the retrieved information matches search criteria of input search criteria 26 and the importance rates assigned to the search criteria of input search criteria 26. Thus, information retrieval system 10 provides greater flexibility than prior information retrieval systems by allowing retrieved information to be evaluated and scored using weighted search criteria.

Figure 5:
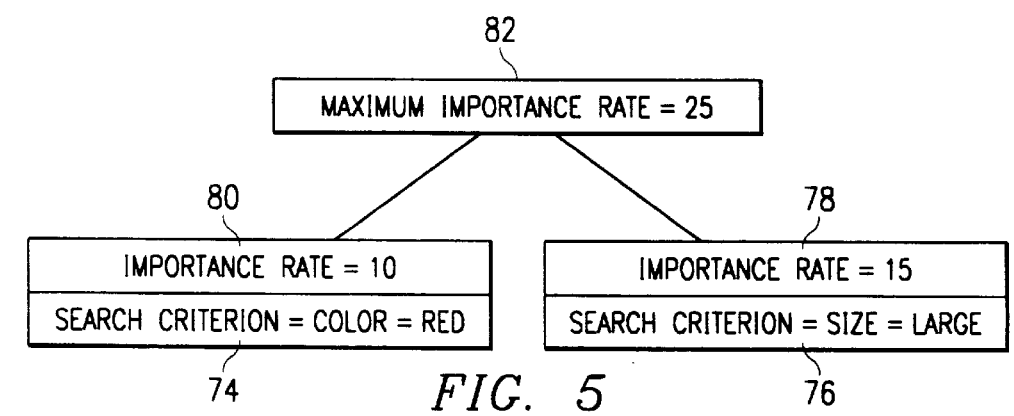
FIG. 5 is an example search query for locating product information from an inventory database.

FIG. 5 is an example search query using an embodiment of information retrieval system 10. In this example, information retrieval system 10 is retrieving and scoring product information from an information source 20 such as product inventory database 24. The search request illustrated in FIG. 4 includes a search criterion 74 defined as a color of red and a search criterion 76 defined as a size of large. Additionally, in this example, locating product information associated with a large product is more important than finding product information associated with a red product. Therefore, a value of 15 is assigned to importance rate 78 associated with search criterion 76 and a value of 10 is assigned to importance rate 80 associated with search criterion 74. The maximum importance rate 82 for the search request is equal to 25, which is the sum of the first level importance rates of importance rate 78 and importance rate 80.

TABLE 1 illustrates retrieved and scored product information using information retrieval system 10 for the example search request illustrated in FIG. 5. In this example, if the retrieved information matches the search criterion, the value of the importance rate for the search criterion is used for the achieved criterion score for the search criterion. If the retrieved information does not match the search criterion, a value of zero is used for the achieved criterion score for the search criterion. As previously discussed, other suitable methods and values may be used for the achieved criterion score determined for the search criterion.

TABLE 1

| Product | Color | Size | Achieved Search Score | Confidence Rate |
| --- | --- | --- | --- | --- |
| A | RED | LARGE | 25 | 100% |
| B | GREEN | LARGE | 15 | 60% |
| C | RED | SMALL | 10 | 40% |
| D | GREEN | SMALL | 0 | 0% |

For example, product information pertaining to product B of TABLE 1 illustrates that product B has a green color and a large size. Since the color of product B is green, the achieved criterion score associated with search criterion 74 equals zero. However, because the size of product B is large, the achieved criterion score associated with search criterion 76 equals the value assigned to importance rate 78, which is equal to 15.

An achieved search score for the search request illustrated in FIG. 5 is determined by combining the first level of achieved scores of the search request. Thus, for product B of TABLE 1, the achieved search score is equal to the achieved criterion score for search criterion 74, which is equal to zero, plus the achieved criterion score for search criterion 76, which is equal to 15, for an achieved search score of 15. The confidence rate for the product information associated with product B is expressed in TABLE 1 as a percentage of the maximum importance rate 82 using the achieved search score of the search request. Therefore, the confidence rate for product information associated with product B equals 15 of 25, or 60 percent. Therefore, information retrieval system 10 provides greater flexibility than prior information retrieval systems by allowing search criteria to be weighted for importance relative to other search criteria and scoring retrieved information using the weighted search criteria.

Figure 6:
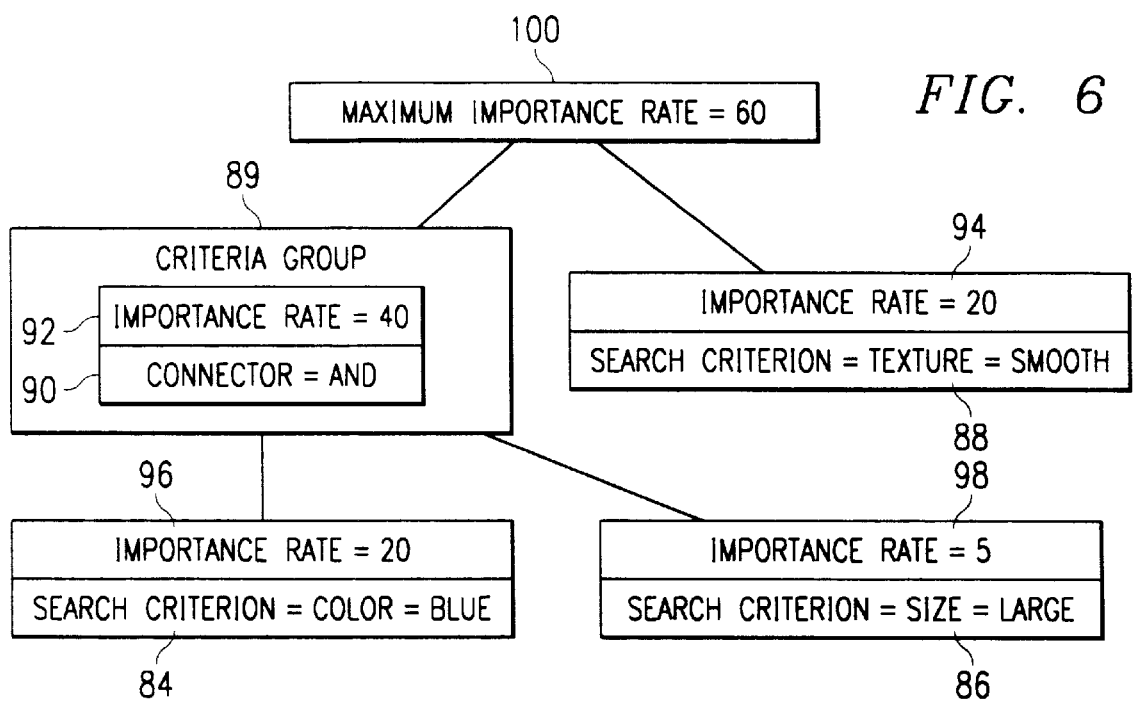
FIG. 6 is another example search query for locating product information from an inventory database.

FIG. 6 is another example search query using an embodiment of information retrieval system 10. In this example, information retrieval system 10 is retrieving and scoring product information from an information source 20, such as product inventory database 24, for a product that is large, blue and smooth. The search request illustrated in FIG. 6, includes a search criterion 84 defined as a color of blue, a search criterion 86 defined as a size of large, and a search criterion 88 defined as a texture of smooth. In this example, retrieving product information associated with a large, blue product is more important than retrieving product information associated with a smooth product. Therefore, a criteria group 89 is defined including search criteria 84 and 86. Search criteria 84 and 86 are grouped or associated together using a connector 90. In this example, connector 90 is shown in FIG. 6 as being defined as "and" because information retrieval system 10 is being used to retrieve product information associated with a product that is both blue and large.

In this example, retrieving product information associated with a product that is large and blue is more important than retrieving product information associated with a product that is smooth. Therefore, a value of 40 is assigned to importance rate 92 associated with criteria group 89 and a value of 20 is assigned to importance rate 94 associated with search criterion 88. Additionally, retrieving product information associated with a product having a color of blue is more important than retrieving product information associated with a product having a large size. Therefore, a value 20 is assigned to importance rate 96 and a value of 5 is assigned to importance rate 98. The maximum importance rate 100 for the search request illustrated in FIG. 6 is equal to 60, which is the sum of the first level importance rates of importance rate 92 and importance rate 94.

TABLE 2 illustrates retrieved and scored product information using information retrieval system 10 for the example search request illustrated in FIG. 6. In this example, if the retrieved information matches the search criterion, the value of the importance rate for the search criterion is used for the achieved criterion score for the search criterion. If the retrieved information does not match the search criterion, a value of zero is used for the achieved criterion score for the search criterion. For example, product information pertaining to product D of TABLE 2 illustrates that product D has a blue color, a small size, and a rough texture. Because the texture of product D is rough, the achieved criterion score associated with search criterion 88 equals zero. As previously discussed, other suitable methods and values may also be used for the achieved criterion scores determined for the search criterion.

TABLE 2

| Product | Color | Size | Texture | Achieved Search Score | Confidence Rate |
|---------|-------|-------|---------|----------------------|-----------------|
| A | BLUE | LARGE | SMOOTH | 60 | 100% |
| B | BLUE | SMALL | SMOOTH | 52 | 86.6% |
| C | BLUE | LARGE | ROUGH | 40 | 66.6% |
| D | BLUE | SMALL | ROUGH | 32 | 53.3% |
| E | GREEN | SMALL | SMOOTH | 20 | 33.3% |
| F | GREEN | LARGE | ROUGH | 8 | 13.3% |
| G | GREEN | LARGE | SMOOTH | 8 | 13.3% |
| H | GREEN | SMALL | ROUGH | 0 | 0.0% |

In this example, the achieved group score for criteria group 89 is determined by calculating a percentage of importance rate 92 based on how closely the retrieved information matches associated search criteria 84 and 86. For example, the sum of the value of importance rate 96 and importance rate 98 equals 25. If the retrieved information associated with search criteria 84 and 86 matches only search criterion 86, a value of 5 out of a possible value of 25, or 20 percent, is obtained for the retrieved information. Thus, in this example, the achieved group score for criteria group 89 is equal to 20 percent of importance rate 92, which is equal to 20 percent of 40, which is equal to 8. As previously discussed, other suitable values and methods may also be used for the achieved group scores determined for criteria groups.

Referring to TABLE 2, for example, because the size of product D is small, the achieved criterion score associated with search criterion 86 equals zero. However, because product D is blue, the achieved criterion score associated with search criterion 84 equals 20. Thus, the achieved group score for criteria group 89 for product D equals 20 out of 25, or 80 percent, of importance rate 92, which equals 40, for an achieved group score equal to 32.

The achieved search score for the search request illustrated in FIG. 6 associated with product D is determined by combining the first level of achieved scores determined for the search request. Thus, the achieved search score for product D is determined by combining the achieved criterion score determined for search criterion 88, which is equal to zero, and the achieved group score for criteria group 89, which is equal to 32, for an achieved search score equal to 32.

The confidence rate associated with product information pertaining to product D is expressed as a percentage of the maximum importance rate 100 of the search request using the achieved search score for product D. Therefore, the confidence rate for product information associated with product D equals 32 of 60, or 53.3 percent.

Figure 7:
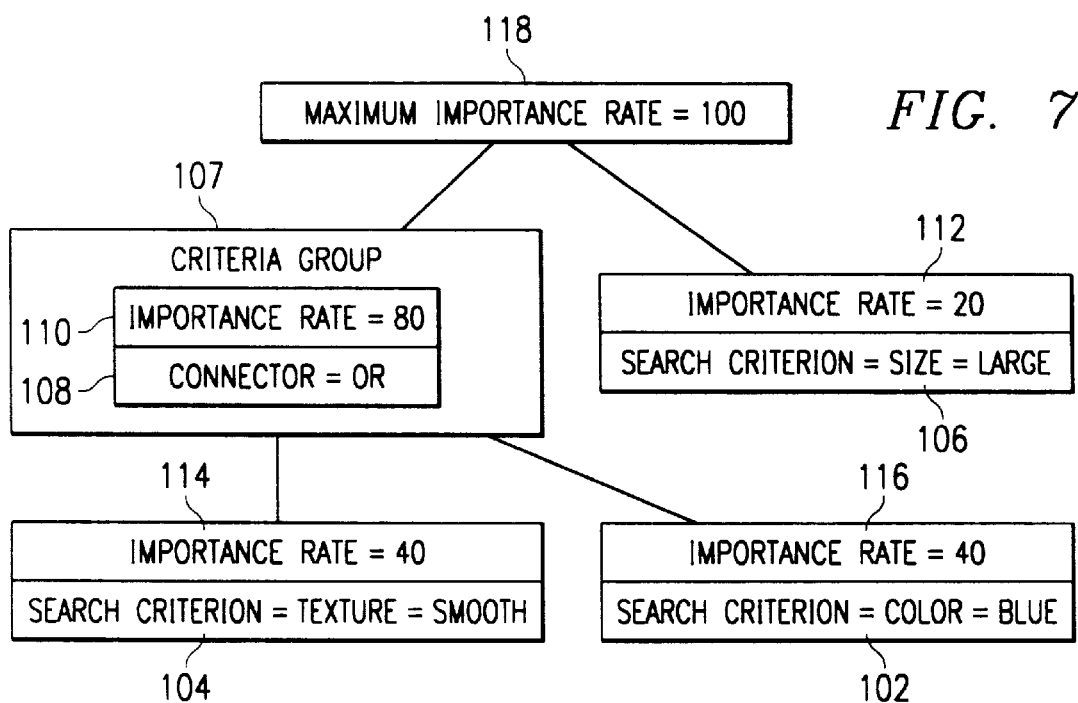
FIG. 7 is another example search query for locating product information from an inventory database.

FIG. 7 is another example search query using an embodiment of information retrieval system 10. In this example, information retrieval system 10 is retrieving and scoring product information from an information source 20, such as product inventory database 24, for a product that is large, and either smooth or blue. The search request illustrated in FIG. 7 includes a search criterion 102 defined as a color of blue, a search criterion 104 defined as a texture of smooth, and a search criterion 106 defined as a size of large.

In this example, retrieving product information associated with a smooth or blue product is more important than retrieving product information associate with a large product. Therefore, a criteria group 107 is defined including search criteria 102 and 104. Search criteria 102 and 104 are grouped or associated together using a connector 108. In this example, connector 108 is shown in FIG. 7 as being defined as "or" because information retrieval system 10 is being used to retrieve product information associated with a product that is either smooth or blue. Additionally, because retrieving product information associated with a smooth or blue product is more important than retrieving product information associated with a large product, a value of 80 is assigned to importance rate 110 and a value of 20 is assigned to importance rate 112.

Additionally, in this example, retrieving product information for a product that is smooth is equally as important as retrieving product information for a product that is blue. Therefore, a value of 40 is assigned to importance rate 114 and a value of 40 is assigned to importance rate 116. In this example, the maximum importance rate 118 for the search request is equal to the sum of the first level importance rates, which is equal to the sum of importance rate 110 and importance rate 112, which is qual to the sum of 100.

TABLE 3 illustrates retrieved and scored product information using information retrieval system 10 for the example search request illustrated in FIG. 7. In this example, if the retrieved information matches the search criterion, the value of the importance rate for the search criterion is used for the achieved criterion score for the search criterion. If the retrieved information does not match the search criterion, a value of zero is used for the achieved criterion score for the search criterion. For example, product information pertaining to product B of TABLE 3 illustrates that product B has a green color, a large size, and a smooth texture. Because the size of product B is large, the achieved criterion score associated with search criterion 106 equals the value of importance rate 112, which is equal to 20. As previously discussed, other suitable methods and values may also be used for the achieved criterion scores determined for the search criterion.

TABLE 3

| Product | Color | Size | Texture | Achieved Search Score | Confidence Rate |
|---------|-------|-------|---------|----------------------|-----------------|
| A | BLUE | LARGE | SMOOTH | 100 | 100% |
| B | GREEN | LARGE | SMOOTH | 100 | 100% |
| C | BLUE | LARGE | ROUGH | 100 | 100% |
| D | BLUE | SMALL | SMOOTH | 80 | 80% |

TABLE 3-continued

| Product | Color | Size | Texture | Achieved Search Score | Confidence Rate |
|---|---|---|---|---|---|
| E | BLUE | SMALL | ROUGH | 80 | 80% |
| F | GREEN | SMALL | SMOOTH | 80 | 80% |
| G | GREEN | LARGE | ROUGH | 20 | 20% |
| H | GREEN | SMALL | ROUGH | 0 | 0.0% |

In this example, the achieved group score for a criteria group using a connector defined as "or" is determined by using the full value of the importance rate assigned to criteria group if the retrieved information matches any of the search criteria of the criteria group. For example, product B is green and smooth. Therefore, the achieved criterion score associated with search criterion 102 equals zero and the achieved criterion score associated with search criterion 104 equals 40. However, because the retrieved information associated with product B matched search criterion 104, the achieved group score for criteria group 107 is equal to the value assigned to importance rate 110, which is equal to 80. As previously discussed, other suitable values and methods may also be used for the achieved group scores determined for criteria groups.

Referring to TABLE 3, an achieved search score for product information associated with product B is determined by combining the first level of achieved scores determined for product B. Thus, the achieved search score associated with product B is equal to the sum of the achieved criterion score associated with search criterion 106, which is equal to 20, and the achieved group score for criteria group 107, which is equal to 80, for an achieved search score equal to 100.

The confidence rate associated with product B is expressed in TABLE 3 as a percentage of maximum importance rate 118 using the achieved search result associated with product B. Thus, the confidence rate associated with product information pertaining to product B is equal to 100 of 100, or 100 percent.

Figure 8:
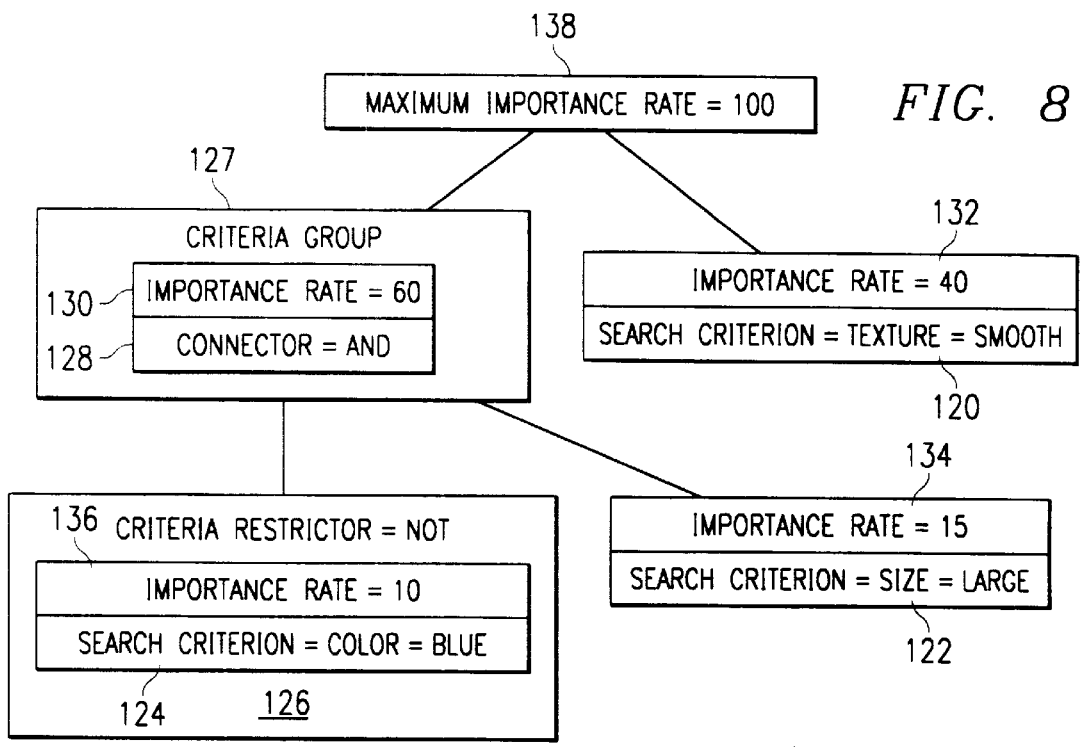
FIG. 8 is another example search query for locating product information from an inventory database.

FIG. 8 is another example search query using an embodiment of information retrieval system 10. In this example, information retrieval system 10 is retrieving and scoring product information from an information source 20, such as product inventory database 24, for a product that is large, not blue and smooth. The search request illustrated in FIG. 8 includes a search criterion 120 defined as a texture of smooth, a search criterion 122 defined as a size of large, and a search criterion 124 defined as a color of blue. Additionally, in this example, criteria restrictor 126 is shown in FIG. 8 as being defined as "not" because information retrieval system 10 is being used to retrieve product information associated with products that are not blue.

In this example, retrieving product information associated with products that are large and not blue is more important than retrieving product information associated with products that are smooth. Therefore, a criteria group 127 is defined including search criteria 122 and 124. Search criteria 122 and 124 are grouped or associated together using connector 128. In this example, connector 128 is shown in FIG. 8 as being defined as "and" because information retrieval system 10 is being used to retrieve product information associated with products that are both not blue and large.

Additionally, because retrieving product information associated with products that are large and not blue is more important than retrieving product information associated with products that are smooth, a value of 60 is assigned to importance rate 130 for criteria group 127 and a value of 40 is assigned to importance rate 132 associated with search criterion 120.

In this example, retrieving product information associated with products that are large is more important than retrieving product information associated with products that are not blue. Therefore, a value of 15 is assigned to importance rate 134 associated with search criterion 122 and a value of 10 is assigned to importance rate 136 associated with search criterion 124. The maximum importance rate 138 of the search request illustrated in FIG. 7 is equal to the sum of the first level importance rates of the search request, which is equal to the sum of importance rate 130, which is equal to 60, and importance rate 132, which is equal to 40, for a maximum importance rate 138 equal to 100.

TABLE 4 illustrates retrieved and scored product information using information retrieval system 10 for the example search request illustrated in FIG. 8. In this example, if the retrieved information matches the search criterion, the value of the importance rate for the search criterion is used for the achieved criterion score for the search criterion. If the retrieved information does not match the search criterion, a value of zero is used for the achieved criterion score for the search criterion. For example, product information pertaining to product F of TABLE 4 illustrates that product F has a blue color, a large size, and a rough texture. Because the texture of product B is rough, the achieved criterion score associated with search criterion 120 equals zero. As previously discussed, other suitable methods and values may also be used for the achieved criterion scores determined for the search criterion.

TABLE 4

| Product | Color | Size | Texture | Achieved Search Score | Confidence Rate |
|---|---|---|---|---|---|
| A | GREEN | LARGE | SMOOTH | 100 | 100% |
| B | BLUE | LARGE | SMOOTH | 76 | 76% |
| C | GREEN | SMALL | SMOOTH | 64 | 64% |
| D | GREEN | LARGE | ROUGH | 60 | 60% |
| E | BLUE | SMALL | SMOOTH | 40 | 40% |
| F | BLUE | LARGE | ROUGH | 36 | 36% |
| G | GREEN | SMALL | ROUGH | 24 | 24% |
| H | BLUE | SMALL | ROUGH | 0 | 0% |

In this example, the achieved group score for criteria group 127 is determined by calculating a percentage of the value assigned to importance rate 130 based on how closely product information matches associated search criteria 122 and 124. As previously discussed, other suitable values and methods may also be used for the achieved group scores determined for criteria groups. In this example, the sum of the value assigned to importance rate 136, which is equal to 10, and the value assigned to importance rate 134, which is equal to 15, is equal to a value of 25.

Because product F is large, the achieved criterion score associated with search criterion 122 is equal to the value assigned to importance rate 134, which is equals to 15. Because product F is blue, the achieved criterion score associated with search criterion 124 equals zero. Thus, the product information associated with search criteria 122 and 124 obtained a value of 15 out of a possible value of 25, or 60 percent. Therefore, the achieved group score for criteria group 127 is equal to 60 percent of the value assigned to importance rate 130, which is equal to 60 percent of 60, for an achieved group score of 36 for product F.

The achieved search score for product information associated with product F is equal to the sum of the first level of achieved scores determined for product F. Thus, the achieved search score associated with product F is equal to the sum of the achieved criterion score associated with search criterion 120, which is equal to zero, and the achieved group score for criteria group 127, which is equal to 36, for an achieved search score equal to 36 for product F.

The confidence rates illustrated in TABLE 4 are expressed as percentages of maximum importance rate 138 using the achieved search scores for the retrieved information. For product information associated with product F, the confidence rate is determined by calculating a percentage of maximum importance rate 138, which is equal to a value of 100, using the achieved search score for product F, which is equal to 36. Thus, the confidence rate associated with product F is equal to 36 of 100, or 36 percent.

Figure 9:
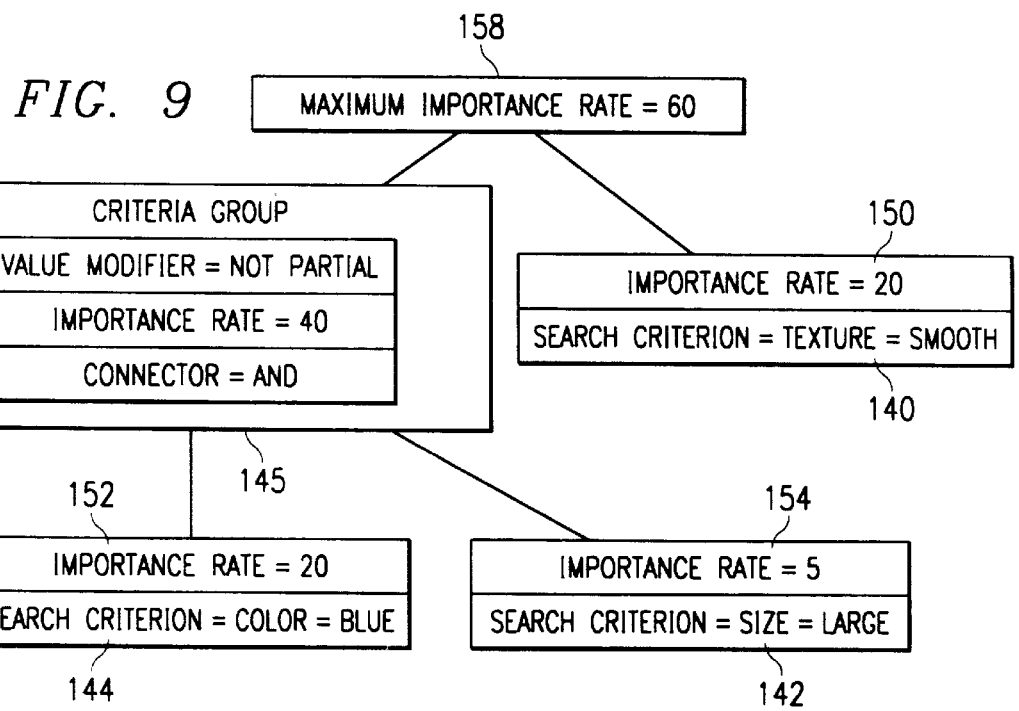
FIG. 9 is another example search query for locating product information from an inventory database.

FIG. 9 is another example search query using an embodiment of information retrieval system 10. In this example, information retrieval system 10 is retrieving and scoring product information from an information source 20, such as product inventory database 24, for a product that is large, blue and smooth. The search request illustrated in FIG. 9 includes a search criterion 140 defined as a texture of smooth, a search criterion 142 defined as a size of large, and a search criterion 144 defined as a color of blue.

In this example, retrieving product information associated with products that are large and blue is more important than retrieving product information associated with products that are smooth. Therefore, a criteria group 145 is defined including search criteria 142 and 144. Search criteria 142 and 144 are grouped or associated together using a connector 146. In this example, connector 146 is shown in FIG. 9 as being defined as "and" because information retrieval system 1f is being used to retrieve product information associated with products that are both blue and large.

As illustrated in FIG. 9, retrieving product information associated with products that are blue and large is more important than retrieving product information associated with products that are smooth. Therefore, a value of 40 is assigned to importance rate 148 for criteria group 145, and a value of 20 is assigned to importance rate 150 associated with search criterion 140. Additionally, in this example, retrieving product information associated with products that are blue is more important than retrieving product information associated with products that are large. Therefore, a value of 20 is assigned to importance rate 152 associated with search criterion 144, and a value of 5 is assigned to importance rate 154 associated with search criterion 142.

In the example illustrated in FIG. 9, information retrieval system 10 is being used to retrieve product information associated with products that are blue, large and smooth, with greater weight or importance placed on retrieving product information pertaining to blue and large products than smooth products. However, a user of information retrieval system 10 may desire to place greater weight or importance on retrieving product information pertaining to smooth products if the product is not both blue and large. As illustrated in FIG. 9, to alter the importance, or weight, of associated search criteria 142 and 144, a value modifier 156 is used.

As previously discussed, value modifiers are used to modify the achieved score determined for search criterion or criteria groups. For example, as described above in connection with FIGS. 6 and 8, the achieved group scores for criteria groups may be determined by calculating a percentage of the importance rate assigned to the criteria group based on how closely the retrieved information matches the search criteria of the criteria group. However, a value modifier may be used to modify the achieved group score determined for the criteria group if the retrieved information does not match each of the search criteria of the criteria group, thereby altering the importance, or weight, assigned to the criteria group.

In this example, value modifier 156 is shown in FIG. 9 as being defined as "not partial" because if the retrieved information does not match all of the associated search criteria, value modifier 156 is used to reduce the determined achieved group score for criteria group 145 to zero. Therefore, in this example, value modifier 156 prevents a group score for criteria group 145 from being a percentage of the value assigned to importance rate 148 for criteria group 145. As previously discussed, other suitable values and methods may also be used for modifying determined achieved scores using value modifiers.

The maximum importance rate 158 of the example illustrated in FIG. 9 is equal to the sum of the first level importance rates of the search request. In this example, maximum importance rate 158 is equal to the sum of the value assigned to importance rate 148, which is equal to 40, and the value assigned to importance rate 150, which is equal to 20, for a maximum importance rate 158 equal to 60.

TABLE 5 illustrates retrieved and scored product information using information retrieval system 10 for the example search request illustrated in FIG. 9. In this example, if the retrieved information matches the search criterion, the value of the importance rate for the search criterion is used for the achieved criterion score for the search criterion. If the retrieved information does not match the search criterion, a value of zero is used for the achieved criterion score for the search criterion. For example, product information pertaining to product F of TABLE 5 illustrates that product F has a blue color, a small size, and a rough texture. Because the texture of product F is rough, the achieved criterion score associated with search criterion 140 equals zero. Additionally, because product F is small and blue, the achieved criterion score associated with search criterion 142 equals zero, and the achieved criterion score associated with search criterion 144 equals 20. As previously discussed, other suitable methods and values may also be used for the achieved criterion scores determined for the search criterion.

TABLE 5

| Product | Color | Size | Texture | Achieved Search Score | Confidence Rate |
|---|---|---|---|---|---|
| A | BLUE | LARGE | SMOOTH | 60 | 100% |
| B | BLUE | LARGE | ROUGH | 40 | 66.6% |
| C | BLUE | SMALL | SMOOTH | 20 | 33.3% |
| D | GREEN | SMALL | SMOOTH | 20 | 33.3% |
| E | GREEN | LARGE | SMOOTH | 20 | 33.3% |
| F | BLUE | SMALL | ROUGH | 0 | 0.0% |
| G | GREEN | LARGE | ROUGH | 0 | 0.0% |
| H | GREEN | SMALL | ROUGH | 0 | 0.0% |

Additionally, in this example, the achieved group score for criteria group 145 is determined by calculating a percentage of the value assigned to importance rate 148 based on how closely the retrieved information matches search criterion 142 and search criterion 144 of criteria group 145. As previously discussed, other suitable values and methods may also be used for the achieved group scores of criteria groups.

Referring to FIG. 9, TABLE 5, and product F, the sum of importance rate 152 associated with search criterion 144, which is equal to 20, and importance rate 154 associated with search criterion 142, which is equal to 5, is equal to 25. Thus, for product F of TABLE 5, the achieved group score for criteria group 145 is equal to 20 of 25, or 80 percent, of the value assigned to importance rate 148, which is equal to 80 percent of 40, for an achieved group score equal to 32. However, because the achieved group score determined for criteria group 145 for product F is equal to "part," or a fraction, of the value assigned to importance rate 148, and because value modifier 156 is defined as "not partial," the achieved group score for criteria group 145 is reduced to zero.

The achieved search score for product information associated with product F is determined by combining the first level of achieved scores of the search request. In this example, the achieved search score associated with product F is equal to the sum of the achieved criterion score determined for search criterion 140, which is equal to zero, and the achieved group score determined for criteria group 145, which is equal to zero, for an achieved search score equal to zero.

The confidence rates illustrated in TABLE 5 are expressed as a percentage of the maximum importance rate 158 of the search request illustrated in FIG. 9 using the achieved search scores determined for the retrieved information. Thus, for product information associated with product F, the confidence rate is equal to zero percent because the achieved search score for product information associated with product F is equal to zero.

Figure 10:
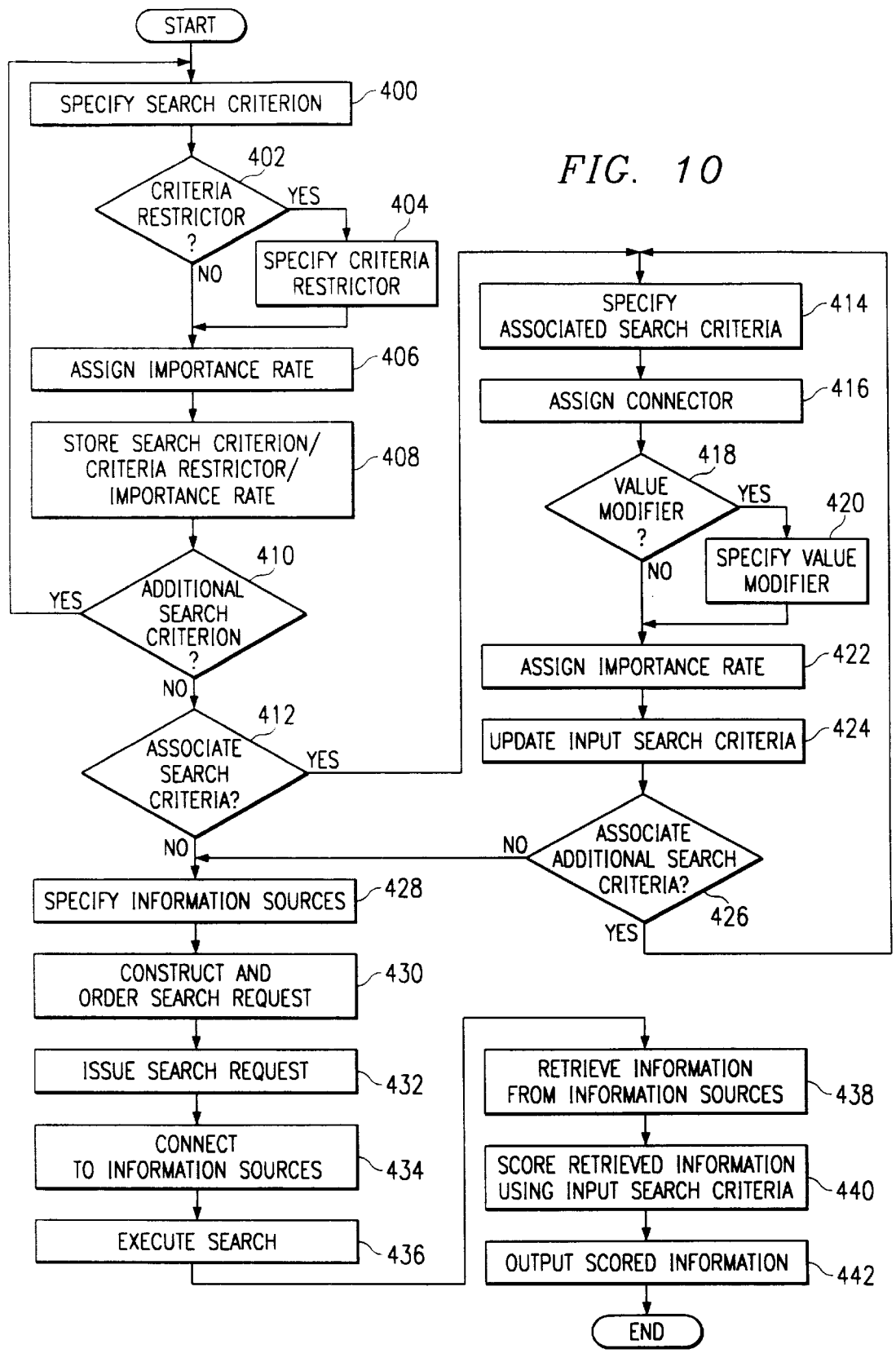
FIG. 10 is a flow chart of a method for retrieving and scoring information from an information source in accordance with an embodiment of the present invention.

FIG. 10 is a flow chart of a method for retrieving and scoring information from an information source in accordance with an embodiment of the present invention. The method begins at step 400, where a search criterion is specified. As discussed above in connection with FIG. 2, search criteria may be specified by a user of information retrieval system 10 using input device 14. Search criteria contained in search criteria library 28 may also be displayed to a user for selecting search criteria. Additionally, search criteria specified by a user may be validated using search criteria library 28 to ensure that specified search criteria conforms to the information contained in the information source.

At step 402, the user may desire to assign a criteria restrictor to the search criterion specified in step 400. If no criteria restrictor is desired at step 402, the method proceeds directly to step 406, where an importance rate is assigned to the search criterion specified in step 400. If a criteria restrictor is desired at step 402, a criteria restrictor may be assigned to the search criterion specified in step 400 at step 404.

The search criterion specified in step 400, any criteria restrictor specified in step 404, and the importance rate assigned to the search criterion in step 406 are stored as input search criteria 26 at step 408. At step 410, the user may desire to specify additional search criterion. If no additional search criterion are desired at step 410, the method proceeds directly to step 412, where the user may group or associate various search criteria. If additional search criterion are desired at step 410, the method returns to step 400, where additional search criterion may be specified by the user.

At step 412, the user may desire to associate two or more search criterion in a criteria group. For example, as described above in connection with FIG. 2, search criteria may be grouped or associated together to place a greater weight or importance on the criteria group relative to other search criterion or criteria groups. If no criteria groups are desired at step 412, the method proceeds directly to step 428, where the user may specify the information sources to be searched.

If the user desires to associate search criterion at step 412, the method proceeds to step 414, where the search criteria to be included in the criteria group are specified. As described above in connection with FIG. 2, the user may select search criterion to be associated using input device 14. A connector is defined for the associated search criteria of the criteria group at step 416.

At step 418, the user may desire to specify a value modifier for the criteria group specified in step 414. For example, as described above in connection with FIG. 9, value modifiers may be used to modify the weight or importance of the criteria group relative to other search criterion or criteria groups. If no value modifier is desired at step 418, the method proceeds directly to step 422, where an importance rate is assigned for the criteria group specified in step 414. If a value modifier is desired at step 418, a value modifier may be specified at step 420.

Input search criteria 26 is updated at step 424 to reflect the criteria group specified in step 414 and any value modifier specified in step 420. At step 426, the user may desire to associate additional search criterion. If no additional search criterion are to be associated, the method proceeds directly to step 428, where the user may specify the information sources to be searched. If additional search criterion are to be associated, the method returns to step 414, where additional criteria groups may be specified.

Processor 12 constructs and orders a search request using input search criteria 26 at step 430. Processor 12 issues the search request in accordance with input search criteria 26 at step 432. At step 434, processor 12 accesses the information sources specified in step 428. As described above in connection with FIG. 1, one or more databases may be selected for performing the search request using information retrieval system 10.

Processor 12 executes the search request constructed in step 430 at step 436. Processor 12 retrieves information from the information sources specified in step 428 at step 438. At step 440, processor 12 scores the retrieved information using scoring application 22 and input search criteria 26. For example, as discussed above in connection with FIGS. 5–9 and TABLES 1–5, a maximum importance rate, achieved criterion and group scores, an achieved search score, and confidence rates may be determined for the search request. The scored information is provided to the user at step 442.

Figure 11:
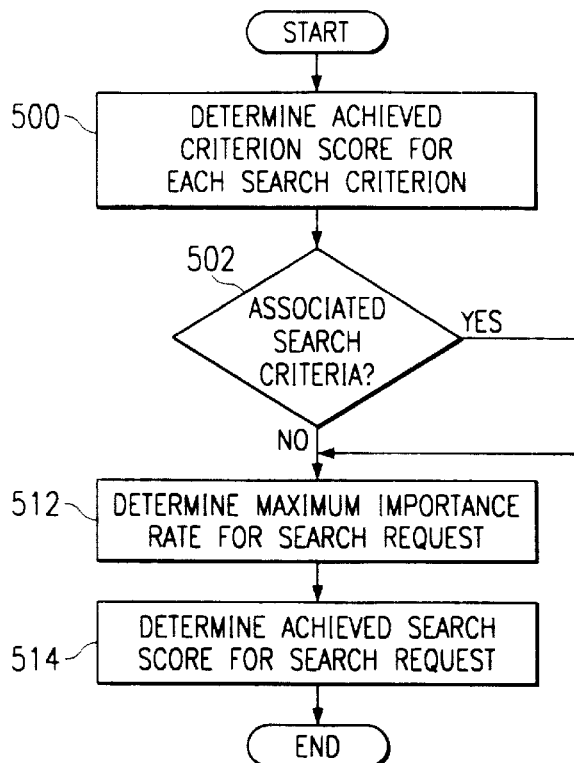
FIG. 11 is a flow chart of a method for scoring information retrieved from an information source in accordance with an embodiment of the present invention.
Figure 11:
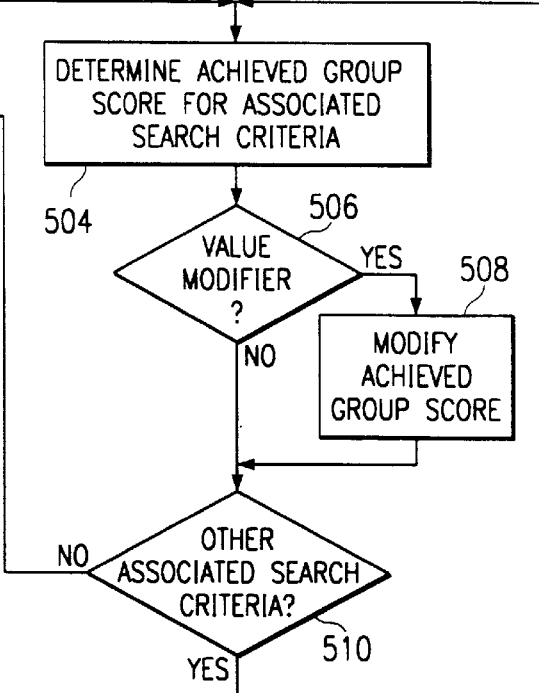

FIG. 11 is a flow chart of a method for scoring retrieved information in accordance with an embodiment of the present invention. The method begins at step 500, where processor 12 determines an achieved criterion score corresponding to each search criterion of the search request using scoring application 22. As discussed above in connection with FIGS. 5–9, the value assigned to the importance rate for each search criterion may be used to determine the achieved criterion score for each search criterion. However, other suitable values or methods may also be used for the achieved criterion score determined for each search criterion.

Processor 12 determines whether any search criterion were associated in a criteria group at step 502. If no search criterion were associated, the method proceeds directly to step 512 where processor 12 determines a maximum importance rate for the search request. If any search criterion were associated, the method proceeds from step 502 to step 504, where processor 12 determines an achieved group score for the criteria group using scoring application 22. As discussed above in connection with FIGS. 6–9, the achieved group score for the criteria group may be determined by calculating a percentage of the importance rate assigned to the criteria group based on how closely the retrieved information matches each of the search criterion of the criteria group. However, other suitable values and methods may also be used for the achieved group scores for criteria groups. An example of determining the achieved group score for a criteria group is described below in connection with FIG. 12.

Processor 12 determines whether a value modifier was assigned to the criteria group at step 506. If a value modifier was not assigned to the criteria group, the method proceeds directly to step 510. If a value modifier was specified for the criteria group, the method proceeds directly from step 506 to step 508, where the achieved group score determined for the criteria group is modified using the specified value modifier. Using value modifiers to modify the weight, or importance, of search criteria is described above in connection with FIG. 9.

Processor 12 determines whether additional search criterion have been associated into criteria groups at step 510. If additional search criterion have been associated, the method returns to step 504, where an achieved group score is determined for the additional criteria groups. If no additional search criterion have been associated into criteria groups, the method proceeds directly to step 512.

Processor 12 determines a maximum importance rate for the search request at step 512. As discussed above in connection with FIGS. 2 and 5–9, the maximum importance rate for the search request is determined by combining the values assigned to the first level of importance rates of the search request. Processor 12 determines an achieved search score for the search request at step 514. As discussed above in connection with FIGS. 5–9, the achieved search score for the search request is determined by combining the first level of achieved scores determined for the search request.

Figure 12:
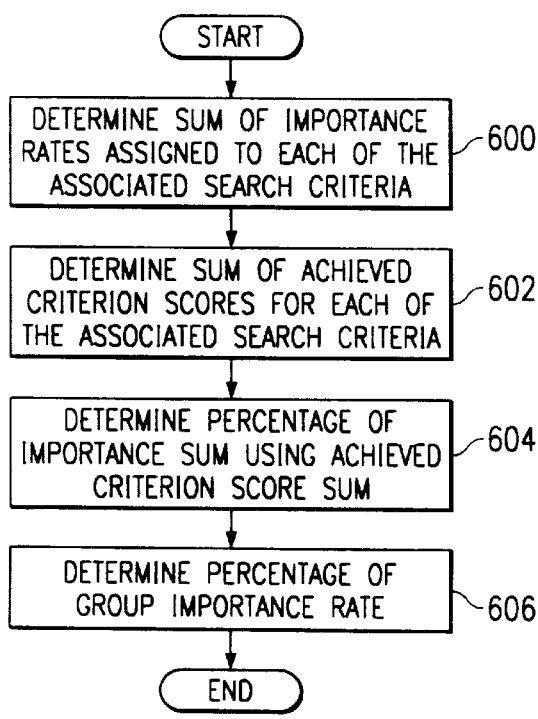
FIG. 12 is a flow chart of a method for scoring information retrieved from an information source in accordance with an embodiment of the present invention.

FIG. 12 is a flow chart of a method for determining an achieved group score for a criteria group in accordance with an embodiment of the present invention. The method begins at step 600, where processor 12 determines the sum of importance rates assigned to each search criterion of the criteria group. For example, referring to FIG. 6, the sum of importance rates assigned to associated search criteria 84 and 86 would be equal to the sum of the value assigned to importance rate 96, which is equal to 20, and the value assigned to importance rate 98, which is equal to 5, for a sum of 25.

Referring to FIG. 12, processor 12 determines a sum of achieved criterion scores for the associated search criteria at step 602. For example, referring to FIG. 6, an achieved criterion score is determined for search criterion 84 and search criterion 86 based on how closely the retrieved information matches search criteria 84 and 86. The achieved criterion scores determined for search criterion 84 and search criterion 86 are combined at step 602 for determining how closely the retrieved information matches the associated search criteria.

Referring to FIG. 12, processor 12 determines a percentage of the importance sum determined in step 600 using the achieved criterion score sum determined in step 602 at step 604. For example, referring to FIG. 6, the sum of importance rates assigned to associated search criteria 84 and 86 is equal to 25. If the sum of achieved criterion scores for associated search criteria 84 and 86 is equal to 20, the percentage of the importance sum using the achieved criterion score sum is equal to 20 of 25, or 80 percent.

Referring to FIG. 12, processor 12 determines a percentage of the importance rate assigned to the criteria group using the percentage value determined in step 604 at step 606. For example, referring to FIG. 6, the value of importance rate 92 assigned to criteria group 89 is equal to 40. The sum of importance rates 96 and 98 is equal to 25. If the sum of achieved criterion scores for associated search criteria 84 and 86 is equal to 20, the percentage of the sum of importance rates 96 and 98 using the sum of achieved criterion scores for associated search criteria 84 and 86 would be equal to 20 of 25, or 80 percent. Therefore, the percentage of the value assigned to importance rate 92 associated with criteria group 89 is equal to 80 percent of 40, which is equal to 32.

Although the present invention has been described in detail, it should be understood that various changes, substitutions, and alterations can be made hereto without departing from the spirit and scope of the invention as defined by the appended claims.

What is claimed is:

1. A method for retrieving and scoring information from an information source, comprising:

receiving one or more search criterion;

assigning an importance rate to each of the search criterion;

generating a search request using the search criterion;

issuing the search request to the information source;

retrieving information from the information source in response to the search request; and determining an achieved criterion score for each of the search criterion using the information retrieved from the information source and the importance rate assigned to each of the search criterion.

2. The method of claim 1, and further comprising assigning a criteria restrictor to at least one of the search criterion.

3. The method of claim 1, and further comprising:

associating two or more of the search criterion in a criteria group;

assigning an importance rate to the criteria group; and determining an achieved group score for the criteria group.

4. The method of claim 1, and further comprising:

determining a maximum importance rate for the search request;

determining an achieved search score for the search request; and determining a confidence rate for the information retrieved from the information source using the maximum importance rate for the search request and the achieved search score for the search request.

5. The method of claim 1, and further comprising determining a confidence rate for the information retrieved from the information source using the importance rate assigned to each of the search criterion and the achieved criterion score determined for each of the search criterion.

6. The method of claim 1, and further comprising:

displaying the information retrieved from the information source; and displaying the achieved criterion score determined for each of the search criterion for the displayed information.

7. The method of claim 1, and further comprising validating the search criterion using a search criteria library.

8. The method of claim 1, and further comprising:

determining a maximum importance rate for the search request;

determining an achieved search score for the search request using the achieved criterion scores determined for each of the search criterion; and determining a confidence rate for the information retrieved from the information source using the maximum importance rate for the search request and the achieved search score for the search request.

9. A system for retrieving and scoring of information from an information source, comprising:

a user interface operable to receive one or more search criterion, the user interface further operable to receive an importance rate assigned to each of the search criterion;

a processor coupled to the user interface and the information source, the processor operable to retrieve information from the information source;

a computer-readable storage medium coupled to the processor; and a computer program encoded on the computer-readable storage medium and executable by the processor, the computer program operable to score the retrieved information using the search criterion and the importance rates assigned to the search criterion.

10. The system of claim 9, and further: comprising a search criteria library coupled to the processor, the search criteria library containing available search criteria.

11. The system of claim 9, wherein the computer program is further operable to sort the scored retrieved information using a confidence rate determined for the retrieved information.

12. The system of claim 9, and further comprising an output device operable to display the scored retrieved information.

13. The system of claim 9, and further comprising a search criteria library coupled to the processor, and wherein the processor is further operable to validate the received search criterion using the search criteria library.

14. The system of claim 9, wherein the user interface is further operable to receive a criteria group comprising two or more search criteria, wherein the user interface is further operable to receive an importance rate assigned to the criteria group, and wherein the computer program is further operable to score the retrieved information using the importance rates assigned to each of the search criterion and the importance rate assigned to the criteria group.

15. A method for scoring information retrieved from an formation source in response to a search request, the search request having one or more search criterion, comprising:

receiving the information from the information source;

determining an achieved criterion score for each of the search criterion using an importance rate assigned to each of the search criterion; and determining an achieved search score for the search request using the achieved criterion scores determined for each of the search criterion.

16. The method of claim 15, and further comprising:

determining a maximum importance rate for the search request using the importance rates assigned to each of the search criterion; and determining a confidence rate for the information received from the information source using the maximum importance rate for the search request and the achieved search score for the search request.

17. The method of claim 15, and further comprising:

displaying the information received from the information source; and displaying the achieved search score determined for the information received from the information source.

18. The method of claim 15, and further comprising determining an achieved group score for two or more search criteria of a criteria group, the criteria group having an assigned importance rate; and wherein the step of determining an achieved search score comprises determining an achieved search score for the search request using the achieved criterion scores determined for each of the search criterion and the achieved group score determined for the criteria group.

19. The method of claim 18, and further comprising:

determining a maximum importance rate for the search request using the importance rate assigned to the criteria group and the importance rates assigned to each of the search criterion not grouped; and determining a confidence rate for the information using the maximum importance rate determined for the search request and the achieved search score determined for the search request.

20. The method of claim 15, wherein the step of determining an achieved criterion score for each of the search criterion comprises:

determining whether the information received from the information source matches the search criterion; and assigning a value equal to the importance rate assigned to the search criterion as the achieved criterion score for the search criterion if the information received from the information source matches the search criterion.

21. A method for retrieving and scoring information from an information source, comprising:

receiving one or more search criterion;

receiving an importance rate assigned to each of the search criterion;

generating a search request using the search criterion;

issuing the search request to the information source;

retrieving information from the information source in response to the search request; and determining an achieved criterion score for each of the search criterion using the information retrieved from the information source and the importance rate assigned to each of the search criterion.

22. The method of claim 21, and further comprising assigning a criteria restrictor to at least one of the search criterion.

23. The method of claim 21, and further comprising:

associating two or more of the search criterion in a criteria group;

receiving an importance rate assigned to the criteria group; and determining an achieved group score for the criteria group.

24. The method of claim 21, and further comprising:

determining a maximum importance rate for the search request;

determining an achieved search score for the search request; and determining a confidence rate for the information retrieved from the information source using the maximum importance rate for the search request and the achieved search score for the search request.

25. The method of claim 21, and further comprising determining a confidence rate for the information retrieved from the information source using the importance rate assigned to each of the search criterion and the achieved criterion score determined for each of the search criterion.

26. The method of claim 21, and further comprising:
displaying the information retrieved from the information source; and
displaying the achieved criterion score determined for each of the search criterion for the displayed information.

27. The method of claim 21, and further comprising validating the search criterion using a search criteria library.

28. The method of claim 21, and further comprising:
determining a maximum importance rate for the search request;
determining an achieved search score for the search request using the achieved criterion scores determined for each of the search criterion; and
determining a confidence rate for the information retrieved from the information source using the maximum importance rate for the search request and the achieved search score for the search request.

* * * * *